Figure 1:
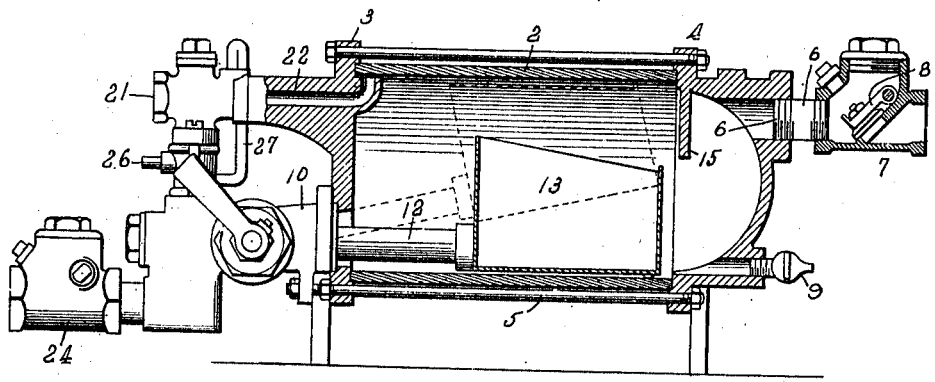

J. W. LYTTON.
RETURN STEAM TRAP.
APPLICATION FILED DEC. 20, 1909.

989,021.

Patented Apr. 11, 1911.

UNITED STATES PATENT OFFICE.

JARARD W. LYTTON, OF FRANKLIN, VIRGINIA, ASSIGNOR TO LYTTON MANUFAC-
TURING CORPORATION, OF FRANKLIN, VIRGINIA, A CORPORATION OF VIRGINIA.

RETURN STEAM-TRAP.

989,021.

Specification of Letters Patent. Patented Apr. 11, 1911.

Application filed December 20, 1909. Serial No. 534,223.

*To all whom it may concern:*

Be it known that I, JARARD W. LYTTON, a citizen of the United States, residing at Franklin, in the county of Southampton and State of Virginia, have invented new and useful Improvements in Return Steam-Traps, of which the following is a specification.

The present invention relates to return steam traps, of that type in which the liquid residuum of the system is trapped and returned to the boiler; furthermore the trap which I have invented is capable of working in and handling the water of condensation of a vacuum system, as will be apparent from the detailed description which follows.

In the drawings which accompany this specification, I have shown one embodiment of my invention, although as the invention may obviously be practiced in different forms without departing from the principle disclosed, I wish it to be understood that this disclosure is merely illustrative and not restrictive, such mechanical expedients as may be resorted to to carry out this invention being within the range of my conception.

Figure 2:
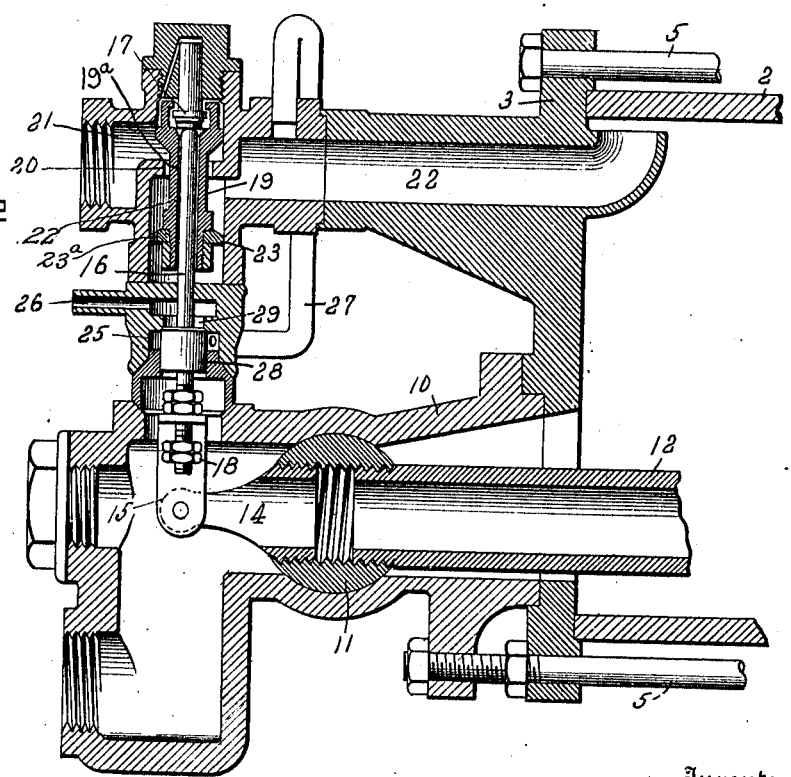

In the drawings:—Figure 1 is a view partly in section of a trap constructed in accordance with my invention. Fig. 2 is an enlarged sectional view of the valve and valve casing, used in connection with the trap shown in Fig. 1.

Referring to the drawings by reference characters, the same characters referring to like parts in the several views, 2 indicates the trap casing which is provided with heads 3 and 4 tied together by longitudinal bolts 5 in the manner disclosed in my Patent No. 788,485, granted April 25, 1905.

The head 4 at the rear end of the trap may be of any suitable form, but is preferably of the semi-spherical interior form shown, and is provided with a downwardly projecting baffle plate 15 opposite the inlet pipe 6, which inlet pipe is provided with a valve casing 7 having a non-return check valve 8 therein, a blow-off or escape cock 9 being provided at the bottom of the head 4, as shown in Fig. 1.

The head 3 at the other end of the trap is provided with a valveless and otherwise unimpeded outlet chamber 10 through which fluid passes from the trap. A hollow trunnion 11 is seated in the admission end of the outlet chamber and has connected thereto a tubular float stem 12 that projects into the trap and carries the float 13, which in the form shown is an open topped or cup shaped receptacle preferably having its top cut on a line at an angle to the bottom, so that as the float rises it may reach its full height within the trap as shown in dotted lines in Fig. 1. The trunnion 11 is provided also with a hollow fork 14 in line with the stem 12, the end of which is pivotally connected to a link 15, the upper end of which link engages the lower end of a stem 16 arranged to abut at its upper end against and unseat a preliminary valve 17, suitable adjusting nuts 18 on said stem being provided so that the play of the link 15 may be regulated within reasonable limits.

The preliminary valve 17 is seated in the upper end of a main valve 19 and closes a passage 19ª passing through said valve which latter valve normally closes a port 20 connecting the pressure inlet 21 with a passage 22, leading to the trap 2, the inlet 21 being connected by a suitable connection not shown with a source of pressure, for instance, a boiler, so that normally boiler pressure stands against the valve 19 holding it closed. As the water of condensation fills the trap 2 the float 13 rises to the dotted line position shown in Fig. 1, until the liquid overflows and fills the float 13 which will then fall to the full line position shown in Fig. 1, bringing the float stem 12, trunnion 11, and fork 14 to the position shown in Fig. 2, which through the link 15 and stem 16 will raise the preliminary valve 17 from its seat and permit pressure to traverse the passage 19ª in the main valve 19, there being sufficient clearance between the passage and the preliminary valve operating stem 16, which projects thereinto, to permit pressure to pass beneath the piston 23 at the lower end of the main valve 19; and since the area of this piston is greater than the area of the valve head 19, the main valve will be immediately thrown from its seat, opening the port 20 and permitting boiler pressure from the inlet 21 to pass by way of the passage 22 to the trap 2. Immediately boiler pressure enters the trap 2 it forces the water from the float 13 by way of float stem 12, trunnion 11, fork 14, and outlet casing 10, through the return valve casing 24, which is provided with a non-return valve. Obviously the non-return check valve 8 in the inlet casing 7 above described, prevents back pressure in the system, and the boiler pressure will, therefore, be effective to force out of the trap the water which has been received. Immediately the float 13 has been freed of its liquid contents it will rise, the stem 16 be drawn downward and the preliminary valve 17 be permitted to close the passage 19ª by gravity or pressure, whereupon pressure will be cut off from below the piston 23 and the main valve 19 will, therefore, be immediately closed by pressure above it. A small hole 23ª is bored through the piston 23 to permit the escape of water from below said piston when the preliminary valve 18 is closed so that the main valve can seat promptly.

In order that atmospheric pressure may be restored, in the trap 2, and where the trap is used in a vacuum system, in order that the vacuum may be broken in the trap 2, I provide an additional chamber 25 below the valve chamber of the main valve 19, which chamber 25 connects by passage 26 with atmosphere, and by connection 27 with the inlet passage 22 to the trap. This chamber 25 is provided with a valve member 28 mounted on the valve stem 16 said valve member 28 being designed to close the port 29 shut off the atmospheric outlet 26 when the preliminary valve 17 is raised in the manner already described, so that the pressure through inlet 21 and passage 22 to the trap 2 will not be broken. When, however, the trap empties and the valves 19 and 17 return to their normal closed positions, the valve member 28 drops from the seat 29 and opens communication from the trap 2 and passage 22 by means of the pipe 27, chamber 25, and outlet 26 with the atmosphere, thus breaking any pressure in the trap 2.

What I claim is:

1. In a steam trap comprising a casing having an inlet, an outlet chamber opening thereinto and to which a fluid delivery pipe is connected, a hollow float in said trap open at the top, a tubular float stem mounted to rock in a seat in the outlet chamber and forming a channel for the escape of the liquid from the trap, a pressure valve casing opening into the trap, a piston valve in said casing guarding the flow of pressure into the trap and provided with a passage to admit said pressure behind the valve piston, a self-seating preliminary valve arranged to close said passage, and means operated through the movement of the float projecting through said passage to bear against and unseat the preliminary valve when the float descends.

2. A steam trap comprising a casing having inlet and outlet, a float in said casing, a pressure valve opening into the trap casing, a piston valve in the valve casing guarding a port through which pressure passes into the trap casing, said piston valve having a passage leading behind the valve piston, a preliminary valve for closing the passage through the piston valve, and means in said passage operated by the float when moving in one direction for raising the preliminary valve to admit pressure on one side of the piston valve for unseating the same and opening said port and when moving in the opposite direction to permit the preliminary valve to close the passage through the piston valve whereby the pressure acts on the opposite end of said piston valve and closes the aforesaid port.

3. A steam trap comprising a casing, having an inlet, a fluid discharge outlet casing opening into the trap, an open top hollow float, a hollow float stem trunnioned in said outlet chamber through which stem and float water is discharged from the trap casing when filled, a pressure operated piston valve having a passage therethrough, a preliminary valve adapted to close said passage and permit pressure to act on said piston valve and close the port leading to the trap casing, and means operated by the falling of the float to raise said preliminary valve and open the passage in the piston valve, that pressure may re-act on the same and open said port to permit said pressure to enter the trap casing.

4. A steam trap comprising a casing having an inlet, a fluid discharge outlet chamber opening into the trap, an open topped hollow float in said trap, a tubular float stem pivotally mounted in said outlet chamber into which chamber said float discharges when filled, a valve mechanism comprising a piston valve for regulating the admission of pressure to the trap, a preliminary valve for opening a passage through the piston valve for the pressure medium to pass below the piston valve to open the same, and a stem connected with the float mechanism and passing through said passage to operate the preliminary valve.

5. A steam trap comprising a casing having an inlet, a fluid discharge outlet chamber opening into the trap, an open topped hollow float in said trap, a tubular float stem pivotally mounted in said outlet chamber into which said float discharges through the tubular stem when filled, a valve mechanism comprising a piston valve for regulating the admission of pressure to the trap, and a preliminary valve controlled by the movement of the float for opening and closing a passage through the piston valve to admit pressure through the same.

6. A steam trap comprising a casing having an inlet, an outlet chamber, a valve casing opening into the trap to admit pressure thereinto, a piston valve having a passage therethrough situated in the valve casing, and operated by pressure to admit or cut off said pressure from the trap as said passage is opened and closed, a preliminary valve guarding said passage in the piston valve, a movable hollow float open at its top, a tubular float stem pivotally mounted in the outlet chamber through which the contents of the trap are discharged into the outlet chamber, and means controlled by said float for operating said preliminary valve to change the direction of pressure on the piston valve.

7. A steam trap comprising a casing having an inlet, and an outlet chamber, a piston valve for controlling the admission of steam under pressure to the trap, an air valve for controlling the entrance of air to said trap, a hollow float open at the top, a tubular float stem pivoted in said outlet chamber through which fluid passes from the float to the aforesaid outlet chamber, a preliminary valve for controlling the direction of pressure against opposite ends of the piston valve, and means operated by said movable float connected to the air valve and adapted to raise the preliminary valve.

8. A steam trap comprising a casing having an inlet and an outlet chamber, a hollow float in said trap, a tubular stem connected to said float pivotally mounted in said outlet chamber and arranged to discharge the fluid contents of the trap into the outlet chamber, a valve casing having a steam inlet connected to the top of the trap, a piston valve in said casing operated by steam pressure, a preliminary valve controlling a passage through said piston valve, an air chamber having a by-pass connection to the trap, a valve in said air chamber, and a rod connected to the movable float carrying the air valve and adapted to unseat the preliminary valve.

In testimony whereof I have hereunto set my hand in presence of two subscribing witnesses.

JARARD W. LYTTON.

Witnesses:
  F. X. Schuller,
  C. C. Vengler, Jr.